Figure 1:
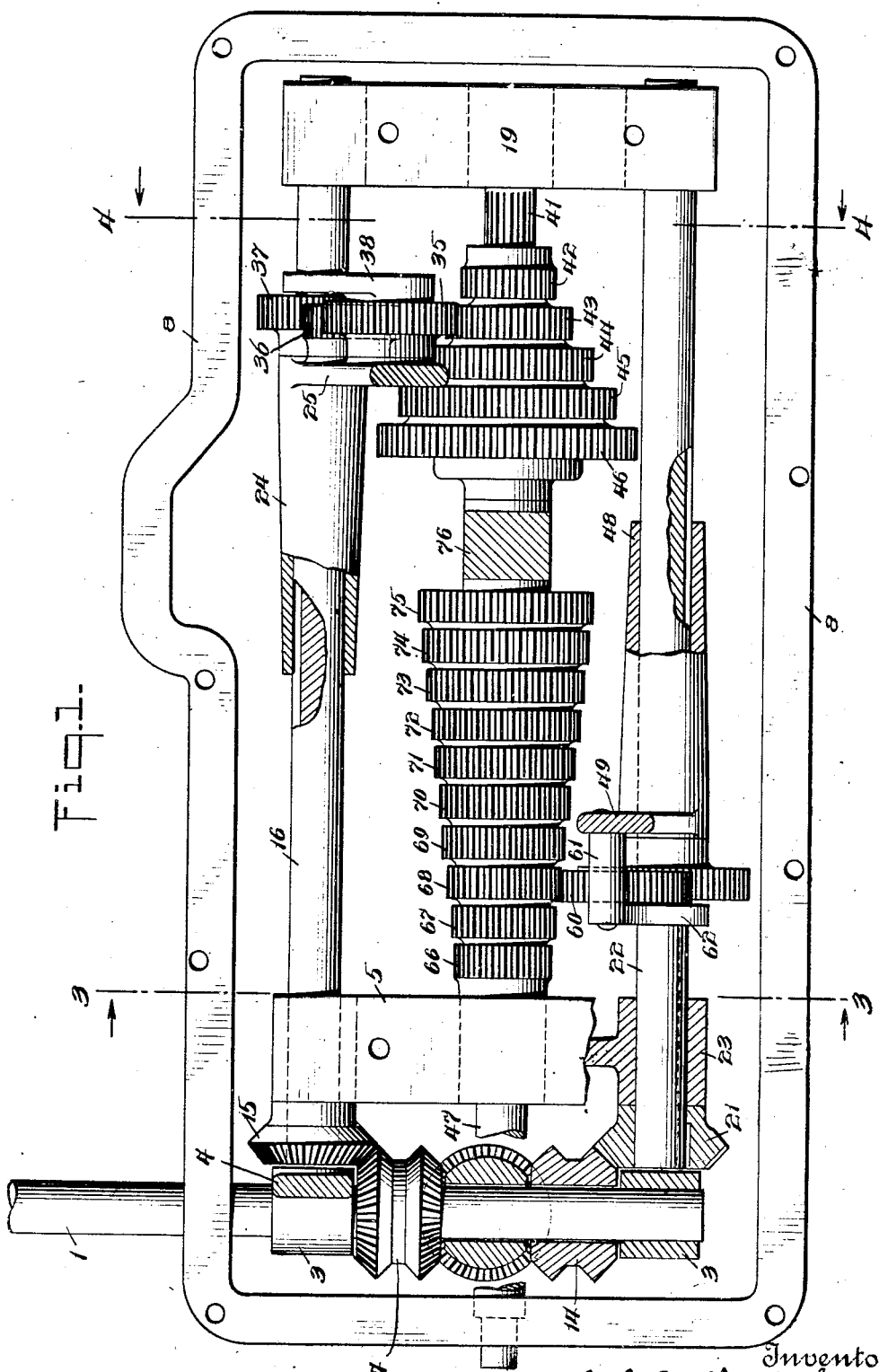

Nov. 16, 1926.

C. E. CHRISTOPHEL 1,606,869

SPEED CHANGING GEARING

Filed July 12, 1921  5 Sheets-Sheet 1

Inventor
Carl E. Christophel
By his Attorneys
Knight Bros

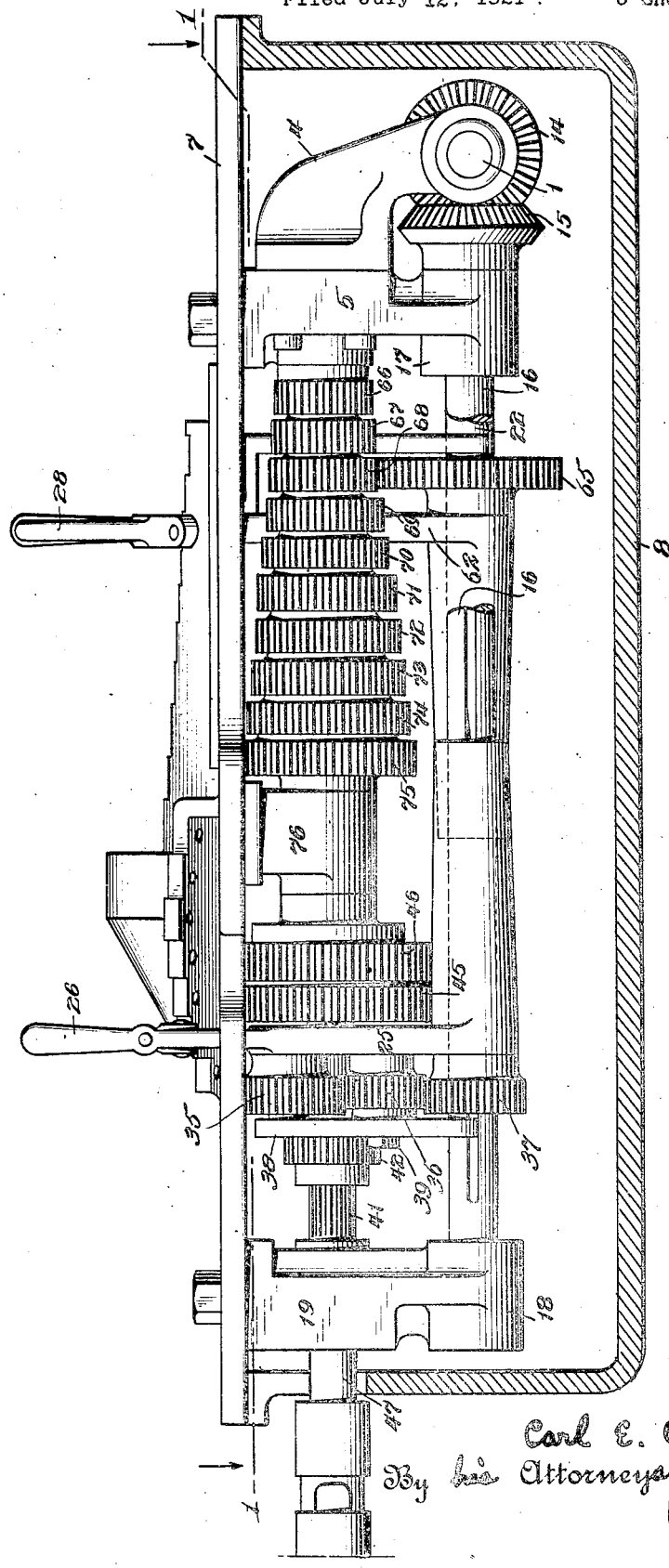

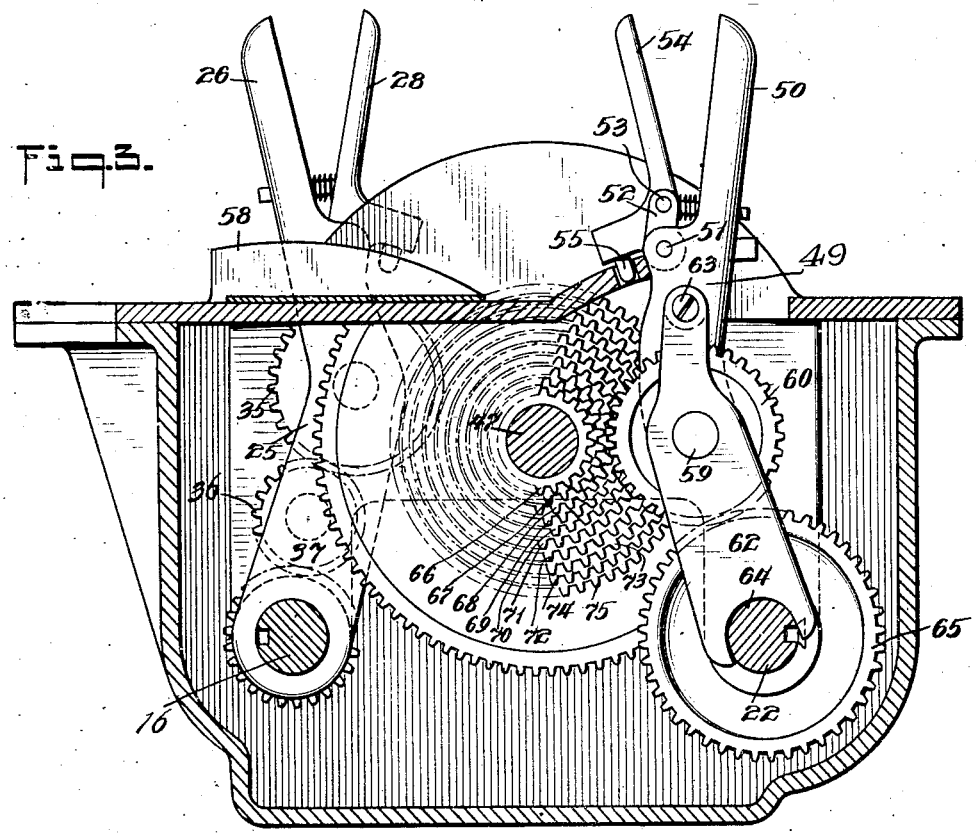

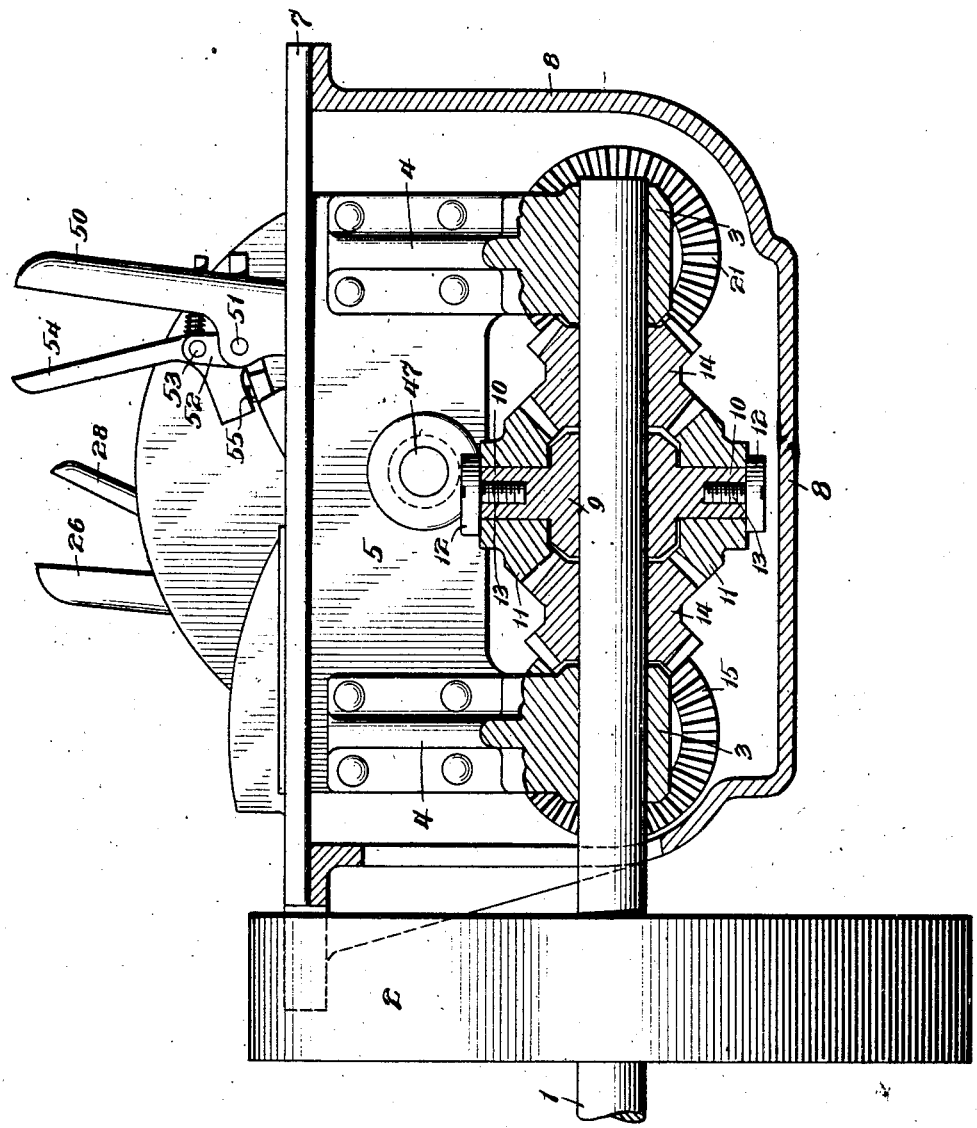

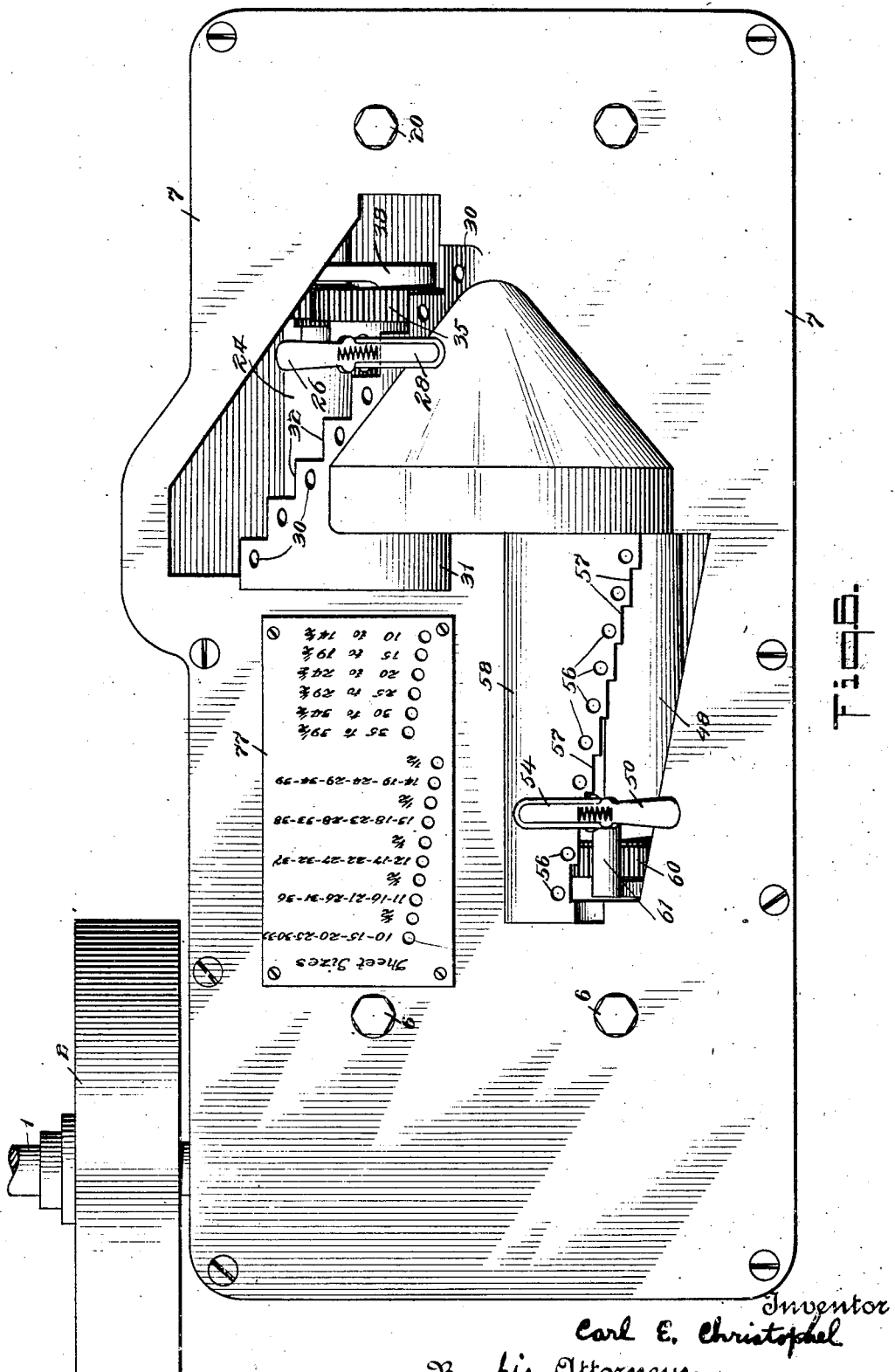

Patented Nov. 16, 1926.

1,606,869

UNITED STATES PATENT OFFICE.

CARL E. CHRISTOPHEL, OF PEARL RIVER, NEW YORK, ASSIGNOR TO DEXTER FOLDER COMPANY, OF PEARL RIVER, NEW YORK, A CORPORATION OF NEW YORK.

SPEED-CHANGING GEARING.

Application filed July 12, 1921. Serial No. 484,077.

This invention relates to speed changing gearing and has for its object in general to provide an improved combination and arrangement of transmission shafts in connection with drive and driven shafts whereby various ratios of speed may be established between said drive and driven shafts, without making it necessary to handle a multiplicity of gears and without the time and labor expenditure required in building up a new chain of change gears whenever it is desired to change from one speed ratio to another. Towards the attainment of this object, the present invention contemplates the arrangement of differential gearing between the transmission shafts and one or the other of said drive or driven shafts. Other and further objects will appear in the specification and be pointed out in the appended claims, reference being had to the accompanying drawings which exemplify my invention in a preferred embodiment.

In the drawings,—

Figure 1 is a top plan view of a preferred embodiment of my invention, according to line 1—1, Figure 2, parts being broken away and parts shown in section, Figure 2 is a longitudinal side elevation of the same, parts being broken away and parts shown in section, Figure 3 is a section on the line 3—3, Figure 1, parts being shown in elevation, Figure 4 is a section on the line 4—4, Figure 1, Figure 5 is a transverse section of the mechanism adjacent its left end according to Figure 6, parts being shown in elevation, Figure 6 is a top plan view of the mechanism in its entirety according to the preferred embodiment shown on the drawings.

In the embodiment of my invention shown on the drawings, the differential has been arranged between the constant velocity or drive shaft and the transmission shafts while the speed cones have been applied to the variable velocity or driven shaft. It is obvious that the differential may be arranged between the driven shaft and the transmission shafts if desired while the speed cones may be placed on the drive shaft or on a shaft which rotates therewith. Referring more particularly to the drawings, a drive shaft 1 may be provided with a pulley 2 (see Figure 5) to adapt it to receive power by means of a motor driven belt (not shown). The drive shaft 1 is journalled in bearings 3 carried by brackets 4, said brackets 4 being mounted on an end frame 5. The end frame 5 is secured by the bolts 6, 6, Figure 6, to the top plate or cover 7 of the housing 8 for the speed changing mechanism to be presently described. As shown in Figure 5, the drive shaft 1 has keyed thereto a differential head 9 with oppositely presented arms 10, 10, upon which are journalled bevel pinions 11, 11. Said pinions 11, 11, are retained in position by the enlarged heads 12, 12 of the screws 13, 13. The differential head 9 is interposed between two twin bevel idlers 14, 14, which are freely journalled on the drive shaft 1. Referring now to Figure 1, it will be seen that one of the twin bevel idlers 14 meshes with a bevel gear 15 which is keyed to a transmission shaft 16, said shaft being journalled at one end in a bracket bearing 17 (see Figure 2) depending from the end frame 5 and at its other end in a similar bracket bearing 18 depending from an end frame 19 which is secured by bolts 20, 20, to the top plate 7. The other twin bevel idler 14 meshes with a bevel gear 21 keyed to a second transmission shaft 22 which is similarly journalled at one end in a bracket bearing 23 depending from end frame 5 and at its other end in a bracket bearing which depends from one frame 19. Reciprocable on the shaft 16, is an elongated sleeve 24, said sleeve being also freely oscillatable on said shaft. Integral with said sleeve and projecting upwardly therefrom is a lever arm 25 which has its upper end deflected toward the right according to Figure 4 and formed into a handle. Pivotally mounted on a pivot 27 carried by the arm 26, is a latch dog 28 (see Figure 4) which carries a locking pin 29 which is adapted to fit into any one of a series of holes or sockets 30 in a curved plate 31 (see Figure 6) which projects above the top plate or cover 7. The curve plate 31 is provided with a series of rectangular notches 32 into which the upper part of the hand lever 25 is adapted to fit so as to locate said hand lever before the locking pin is permitted to enter one of the holes or sockets 30. The hand lever 25 is provided with laterally projecting journal pins 33 and 34 (see Figure 4) upon which are journalled an upper idler gear 35 and a lower idler gear 36, the lower idler 36 meshing with a spur gear 37 splined to the shaft 16. A guard plate or bracket 38 is secured to the journal pin 34 by means of a screw 39, said guard plate being adapted to retain the gears 35 and 36 in position on their respective journal pins 33 and 34. The lower end of the guard plate or bracket 38 is provided with a semi-circular recess 40 which has journalling contact with the shaft 16. The gear 35 is adapted to mesh with any one of the stepped gears 41, 42, 43, 44, 45 and 46 depending upon which of the notches 32 is occupied by the hand lever 26, said stepped gears being keyed to the driven shaft 47, which is journalled at opposite ends in the end frames 5 and 19. A second sleeve 48 which has a combined oscillatory and sliding movement is provided with a hand lever 49 which as shown in Figure 3 is provided with a hand grip 50 which carries a pivot pin 51 which pivotally mounts a link 52 which is provided with a pivot 53 upon which oscillates a latch dog 54 provided with a pin 55 which is adapted to enter any of the holes or sockets 56 (see Figure 6), the hand lever being thereby retained in engagement with any one of the notches 57 which are formed in a curved plate 58 which projects above the top plate 7. As shown best in Figure 3, the hand lever 49 carries a laterally projecting pin 59 upon which is journalled an idler gear 60. As shown in Figure 1, the hand lever 49 also carries a laterally projecting post 61 to the outer end of which is secured a guard plate or bracket 62 by means of a screw 63. Said guard plate 62 is provided with a recess 64 which slidably engages the transmission shaft 22. Splined to the shaft 22 is a spur gear 65 which meshes with the idler 60. As the sleeve 48 is reciprocated on the shaft 22, the guard plate 62 maintains the gears 60 and 65 in mesh as they are moved lengthwise of the axis of the shaft 22. The gear 60 is adapted to mesh with any one of the gears 66 to 75 inclusive which are geared to the driven shaft 47 and constitute a series of stepped gears of different diameters which are arranged in reverse order with respect to the gears 41 to 46 inclusive. These two series of stepped gears comprise speed changing cones on opposite sides of a bearing 76 which depends from the top plate 7 as shown in Figure 2. For convenience in setting the hand lever 25 and 49 to determine the ratio of speed transmission, an index plate 77 is secured to the top plate 7 of the housing. This index plate 77 contains in tabulated arrangement a series of numbers to denote the different sizes of sheets. In the upper table of figures shown on the plate 77, every other series denotes lengths of sheets in inches. The holes at the left ends of these series correspond respectively to holes 56 in the curved plate 58. The series of figures in the lower table of the plate 77 also relate to lengths of sheets in inches, the holes at the left end of said series corresponding to the hole 30 in the curved plate 31. As an example of the operation of the machine let it be supposed that the speed changing gearing has to be set for feeding sheets 25 inches long from a pile. The operator proceeds as follows:— The hand lever 25 is first released by gripping the hand grip 26 and releasing the latch dog 28 to permit the sleeve 24 to slide along the shaft 16 until the locking pin 29 comes into a position to enter the third hole 30 from the left end in the curved plate 31, according to Figure 6. Said hole 30 corresponds to the third series of figures in the lower table of index plate 77 which reads "25 to 29½". He next releases the latch dog 54 to permit the sleeve 48 to slide along the shaft 22 until the locking pin 55 is in position to enter the hole 56 at the left end of the curved plate 58, this hole corresponding to the first series of figures in the upper table of the index plate 77. Power being applied to the driving pulley 2, a sheet feeding machine which is connected up with the speed changing mechanism hereinbefore described will deliver sheets in proper sequence and properly spaced from each other. By an inspection of Figures 1, 3 and 4, it will be understood that with the shafts 16 and 22 disconnected from driven shaft 47, drive shaft 1 operates to rotate said shafts 16 and 22 in opposite directions. Furthermore, it will be seen that the geared connections between shafts 16 and 47 as well as the geared connections between shafts 22 and 47 correspond to one and the same direction of rotation of driven shaft 47. When, however, both of the shafts 16 and 22 are geared to the driven shaft 47, the resultant rotation imparted to driven shaft 47, will be that due to the combined rotations of shafts 16 and 22 under the control of the differential mechanism including planetary bevel gears 11.

I claim:—

1. In a mechanism of the character described, a constant velocity shaft, a variable velocity shaft, two sets of stepped gears keyed to one of said shafts, a pair of power transmitting shafts, means for variably gearing said power transmitting shafts to the respective sets of said stepped gears, and differential mechanism for connecting said power transmitting shafts with the other of the first mentioned shafts.

2. Speed changing mechanism comprising a drive shaft, a pair of transmission shafts, differential mechanism connecting said transmission shafts to said drive shaft, a driven shaft provided with axially spaced sets of stepped cone gears, each set containing a plurality of gears of different diameters, and gearing means reciprocable along each of said transmission shafts for connecting each transmission shaft with its particular set of stepped cone gears.

3. In mechanism of the character described, a drive shaft, a driven shaft, a differential head keyed to one of said shafts, differential gears geared to said differential head, transmission shafts geared to said differential gears, sleeves reciprocably mounted on said transmission shafts respectively, each of said sleeves being provided with a radial arm, a gear splined to each of said transmission shafts and slidable longitudinally thereof by the reciprocable movement of the sleeve on that shaft, gear cones keyed to the other of said shafts, and gears journalled in said radial arms for completing the geared connection between each of said transmission shafts and any of the gears in the gear cone corresponding thereto on said other shaft.

4. In mechanism of the character described, a drive shaft, a driven shaft, a differential head keyed to one of said shafts, differential gears geared to said differential head, oppositely rotating transmission shafts, geared to said differential gears, sleeves reciprocably mounted on said transmission shafts respectively, each of said sleeves being provided with a radial arm, a gear splined to each of said transmission shafts and slidable longitudinally thereof by the reciprocable movement of the sleeve on that shaft, gear cones keyed to the other of said shafts, and gears journalled in said radial arms for completing the geared connection between each of said transmission shafts and any of the gears in the gear cone corresponding thereto on said other shaft.

5. In mechanism of the character described, a drive shaft, a differential head mounted thereon, differential shafts geared to said differential head, a driven shaft, speed cones mounted on said driven shaft to correspond to said differential shafts respectively, and geared means adjustable along each of said differential shafts for effecting different variable speed ratio connections between the respective differential shafts and said driven shaft.

6. In mechanism of the character described, a power driven shaft, a driven shaft, transmission shafts arranged on opposite sides of one of said shafts, two speed cones keyed to that one of said shafts, a differential movement connecting the other of the first mentioned shafts to said transmission shafts, a sleeve reciprocable on each of said transmission shafts, and idler gears mounted on said sleeves for connecting said transmission shafts with different gears in said gear cones.

7. In mechanism of the character described, a power drive shaft, a driven shaft, transmission shafts arranged on opposite sides of one of said shafts, two speed cones keyed to that one of said shafts, differential mechanism connecting the other of the first mentioned shafts to said transmission shafts, a sleeve reciprocable on each of said transmission shafts, and idler gears mounted on said sleeves for connecting said transmission shafts with different gears in said gear cones, said mechanism being provided with a top plate having notches therein and said sleeves having hand levers for oscillating said idler gears into and out of mesh with said gear cones and longitudinally thereof, said hand levers fitting into said notches for retaining said idlers in any desired geared relation.

CARL E. CHRISTOPHEL.